United States Patent
Janardhan et al.

(10) Patent No.: US 9,118,814 B2
(45) Date of Patent: Aug. 25, 2015

(54) SET-TOP BOX PEER-ASSISTED VIDEO-ON-DEMAND

(75) Inventors: Vaishnav Janardhan, New York, NY (US); Henning Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1002 days.

(21) Appl. No.: 12/648,105

(22) Filed: Dec. 28, 2009

(65) Prior Publication Data

US 2010/0146569 A1 Jun. 10, 2010

Related U.S. Application Data

(63) Continuation of application No. PCT/US2008/008077, filed on Jun. 27, 2008.

(60) Provisional application No. 60/946,905, filed on Jun. 28, 2007.

(51) Int. Cl.
*H04N 7/173* (2011.01)
*H04N 21/433* (2011.01)
(Continued)

(52) U.S. Cl.
CPC ....... *H04N 7/17318* (2013.01); *H04N 21/4331* (2013.01); *H04N 21/43615* (2013.01); *H04N 21/4788* (2013.01); *H04N 21/47202* (2013.01)

(58) Field of Classification Search
CPC .......... H04N 21/47202; H04N 21/632; H04L 67/104; H04L 67/1076; H04L 67/1078; H04L 67/108; H04L 67/1085
USPC ...................... 725/94, 98, 131; 709/231, 203; 707/609–622
See application file for complete search history.

(56) References Cited

U.S. PATENT DOCUMENTS 5,414,455 A * 5/1995 Hooper et al. .................. 725/88
7,937,362 B1 * 5/2011 Lian et al. ..................... 707/622
(Continued)

FOREIGN PATENT DOCUMENTS

SE WO 2008/024037 * 2/2008
WO WO 2008/002295 * 1/2008
(Continued)

OTHER PUBLICATIONS

"BiToS: Enhancing BitTorrent for Supporting Streaming Applications" by Aggelos Vlavianos, Marios Iliofotou and Michalis Faloutsos; Department of Computer Science and Engineering; University of California Riverside, Riverside, CA; 25th IEEE Infocom, Apr. 2006.*
(Continued)

*Primary Examiner* — Brian T Pendleton
*Assistant Examiner* — Alan Luong
(74) *Attorney, Agent, or Firm* — Schwegman Lundberg & Woessner, P.A.

(57) ABSTRACT

A peer-to-peer (P2P) video-on-demand (VoD) system or method use a plurality of LP-enabled VoD set-top box (STB) peers in a pool for providing video content data to a requesting client peer in the pool. One other peer in the pool can be designated as a parent peer for downloading high priority playback content that is substantially immediately needed for playback display. Low priority pre-fetch content can be downloaded to the requesting client peer from another peer in the pool other than the parent peer. Bandwidth at the requesting client peer that is not used by the playback module for downloading the high priority playback video content data can be allocated for downloading the pre-fetch content. Using the requesting client peer, video content data can be served, for the playback display on a video monitor, wherein such served video data content can comprise the playback content and the prefetch content.

23 Claims, 5 Drawing Sheets

(51) Int. Cl.
*H04N 21/436* (2011.01)
*H04N 21/472* (2011.01)
*H04N 21/4788* (2011.01)

(56) References Cited

U.S. PATENT DOCUMENTS

| | | | |
|---|---|---|---|
| 2002/0154892 A1* | 10/2002 | Hoshen et al. | 386/87 |
| 2006/0161635 A1 | 7/2006 | Lamkin et al. | |
| 2007/0127481 A1* | 6/2007 | Park et al. | 370/392 |
| 2007/0130361 A1* | 6/2007 | Li | 709/231 |
| 2007/0277219 A1* | 11/2007 | Toebes et al. | 725/139 |
| 2009/0177792 A1* | 7/2009 | Guo et al. | 709/231 |
| 2010/0235432 A1* | 9/2010 | Trojer | 709/203 |

FOREIGN PATENT DOCUMENTS

| | | | |
|---|---|---|---|
| WO | WO 2008/002298 | * | 1/2008 |
| WO | WO-2009/005747 | | 1/2009 |

OTHER PUBLICATIONS

"International Application Serial No. PCT/US2008/008077, Search Report & Written Opinion mailed Oct. 2, 2008.", P220.

"Chinese Application Serial No. 200880021804.2, Office Action mailed May 19, 2011", (w/ English Translation), 7 pgs.

"Chinese Application Serial No. 200880021804.2, Response fiied Sep. 29, 2011 to Office Action mailed May 19, 2011", (w/ English Translation of Claims), 11 pgs.

\* cited by examiner

SET-TOP BOX PEER-ASSISTED VIDEO-ON-DEMAND

CLAIM OF PRIORITY

This application is a continuation under 35 U.S.C. 111(a) of International Application No. PCT/US2008/008077, filed Jun. 27, 2008 and published as WO 2009/005747 A1 on Jan. 8, 2009, which claimed priority under 35 U.S.C. 119(e) to U.S. Provisional Ser. No. 60/946,905, filed Jun. 28, 2007; which applications and publication are incorporated herein by reference and made a part hereof.

FIELD

This document pertains generally to content distribution and more particularly, but not by way of limitation, to peer-assisted video-on-demand for a set-top box based IP network.

BACKGROUND

IP-enabled set-top boxes (STBs) can be used in home networks, and can support voice, video and data. Cable operators (MSOs) provide a limited menu of video-on-demand (VoD) choices for STBs. Set-top boxes for IP-based delivery can include large disk drives or other storage. For example, the most recent model of the Tivo DVR contains a 250 GB drive, which can store 300 hours of standard-quality MPEG2 or 32 hours of high-definition video.

OVERVIEW

The present inventors have recognized, among other things, that streaming VoD from centralized servers can be expensive, both in terms of bandwidth and server capacity. As an illustrative example, YouTube can streaming 40 million videos and 200 TB of data each day, paying 1 million dollars each month for transmission. The cost would be considerably higher for high-definition, movie-length content. In 2002, Netflix was said to distribute about 1,500 TB of DVDs each day.

Approaches to video streaming using peer-to-peer networks can include an application level multicast tree based approach, or a mesh-based push or pull approach for distributing the content. In one approach, VoD service can be provided for STBs, but this approach does not use the large storage of STBs for pre-fetching, and does not support VCR operations. Most approaches do not support VCR operations, load balancing, or admission control. Ensuring quality of service to the subscriber can be very important in pay-per-view service.

DETAILED DESCRIPTION

Figure 1:
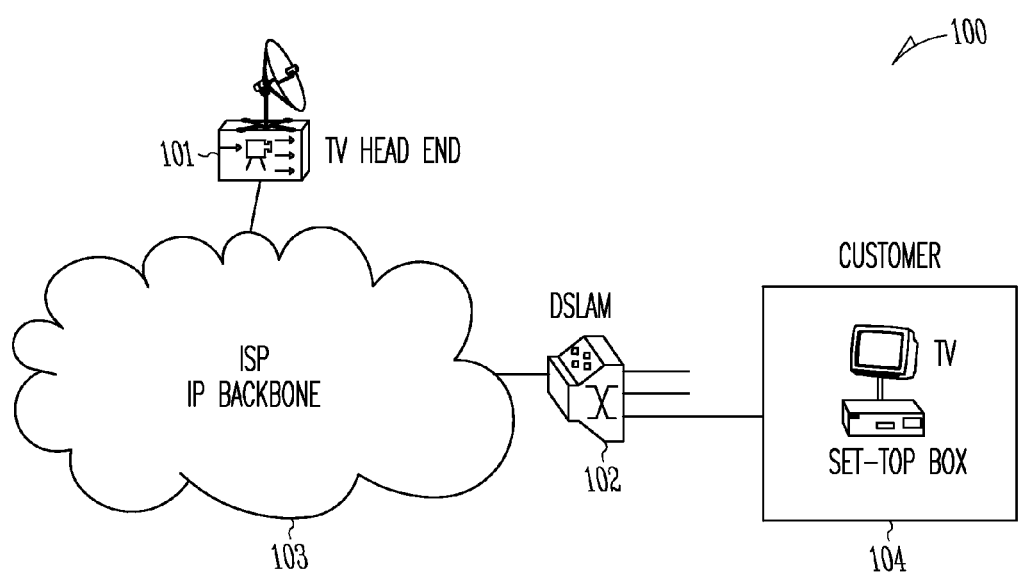
FIG. 1 shows an example of an IPTV service architecture in which a TV head-end can source IPTV contents to Digital Subscriber Line Access Multiplexers (DSLAMs) such as through an ISP backbone.

IP-enabled set-top boxes (STBs) can be used in home networks, and can support voice, video and data. Cable operators (MSOs) provide a limited menu of video-on-demand (VoD) choices for STBs. Set-top boxes for IP-based delivery can include large disk drives or other storage.

Streaming VoD from centralized servers can be expensive and problematic, not just in terms of bandwidth and server capacity, but also in terms of scalability. The present inventors have recognized, among other things, that STBs can peer-to-peer stream video. This can include, for example, either movies that the owner of the STB has watched, or those that a peer-to-peer coordination function downloads to the STB, such as in anticipation of demand by other users owning other peer STBs. In general, STBs can be assumed to be available continuously—even if the STB owner is not watching a movie. Poor scalability of centralized VoD service can significantly increase the cost of streaming popular high definition video.

Scalability can be enhanced using certain peer-to-peer (P2P) techniques. In certain approaches, however, the system has to scale with more users requesting the same file. In an example of live streaming, only one particular download has to be managed by maintaining a low delay, which can be performed by intelligently forwarding the load. A P2PVoD system should be capable of scaling by collaboratively downloading multiple video files, while being capable of streaming the file at the same time. This can combine both the file sharing and file streaming challenges and capabilities into the same system.

This document describes, among other things, a peer-assisted VoD architecture that can use localized P2P systems, such as appropriately-configured STBs. This can permit streaming video to peer STBs from other peer STBs in the same local network or other designated pool of peers. The P2PVoD system can reduce the cost of transferring the video content, and can also be highly scalable and reliable, with good admission control primitives.

In certain examples, the systems or methods can include VoD features like fast-forwarding, re-winding (or other VCR operations), and low startup delay. The system can provide short startup delay, can provide a high percentage of the data received before its scheduled playback deadline (which can be referred to as "goodput"), and can provide high overall download capacity utilization, such as by using certain techniques for avoiding starvation. The system can provide scalability in terms of the number of users, number of movies, or number of complete video files available. Moreover, the system can help long tail content in a cost effective and scalable manner, such as based on user demand. This can help overcome some of the most difficult challenges of VoD.

In certain examples, the present systems or methods can satisfy one or more such challenges by enabling a complete distributed video content catalog, with the content pre-buffered on STBs, such as based on expected demand for the content. Some examples can allow a service provider to easily inject new content, or to replicate existing content, such as based on the user demand for that particular content. In testing, systems can be evaluated using goodput or bandwidth utilization as metrics to evaluate performance. In certain examples, the present P2PVoD client peer can work independently on any Linux STB or other system, and can start playing a movie by downloading the movie from other peer nodes after a brief startup delay.

Certain approaches to peer-to-peer video streaming can involve an application level multicast tree based approach, or a mesh-based push or pull approach for distributing content. Certain approaches simulating VoD using STBs do not use the large storage of STBs or pre-fetching of video content, nor do such approaches support VCR operations. Certain other approaches do not support VCR operations, and do not provide load balancing or admission control primitives, so they cannot ensure quality of service (QoS) to a subscriber, which can be a problem inhibiting success as a pay-per-view service. Some approaches can provide analysis of single video distribution, such as using a Poisson arrival model. Real traces can be used to simulate strategies for pre-fetching of future content. One approach can use a Push-to-Peer scheme in which the primary copies of the catalog can be pushed to STBs that are used for video-on-demand. However, the present systems and methods can provide a complete P2PVoD system that can have a low startup time, can provide a better user experience with reduced jitter by pre-fetching the contents, and can provide very low seek delay, such as during a VCR operation, by prioritizing the download.

In certain examples, a system can include four modular components: a directory, a chunk map, a retrieval protocol, and a video client. The directory can map names of movies (or other video or other content) to respective internal identifiers, such as by using a global distributed hash table (DHT). For a particular movie, a chunk map can indicate which peer node in the pool of peers holds a copy of a chunk of video content data within the local network. A chunk map can be stored in an unstructured peer-to-peer network; there will likely be multiple copies of the same chunk, such as stored at different peer nodes in the peer-to-peer network pool. A chunk map can be updated, such as on an ongoing basis as STBs download or expunge content. Some approaches can assume that content providers seed a sufficient number of STBs with content, such as based on estimates of the content's future popularity. (To deal with "flash crowds," content can be pushed to the peers ahead of the public release date. Time-restricted DRM, or the later delivery of one or more crucial components, such as parts of MPEG I frames, can be used to prevent viewing ahead of the official release date.) The retrieval protocol can downloads chunks to a peer STB from the other peer STBs, e.g., as fast as the content serving-peer and the network capacity allow.

In some examples, each STB can act as a local video server, and can respond to one or more specified stream control protocols, such as the Real Time Streaming Protocol (RTSP). An existing video client, such as presently used for streaming, can be used, if desired, such as drawing on the local STB. In some examples, this can also allow multiple viewers within the same household to share a common local STP.

FIG. 1 illustrates an example of an Internet Protocol Television (IPTV) service architecture 100. In this example, a TV head-end 101 can sources IPTV content, such as to Digital Subscriber Line Access Multiplexers (DSLAMs) 102, such as through an ISP backbone 103. In some examples, customers 104 subscribe to VoD, IP telephone, or Internet access services. The STBs within a particular geographical area can connect to a common DSLAM. This can form a subnet. Such subnets, in turn, can connect to the national or international IP backbone network. The STBs within the subnet can have the same IP address prefix. This can help an STB peer identify the general geographic location of location of another STB peer. The STBs peers from various different subnets can form an unstructured P2P network or a portion of a P2P network.

For transmitting video content data, video content files can be split into "chunks" of video content data. Such chunks can be further split into blocks, such as fixed-size blocks (e.g., 16 KB), that can be retrieved individually. In an illustrative example, 1 MB chunks of video content can be used. The particular chunk size selected can affect the transaction overhead of selecting a particular chunk to be downloaded from another STB peer node. A smaller chunk size will increase overhead in chunk and peer selection and negotiation between STB peer nodes. However, multiple downloading of chunks of large chunk size can reduce scalability of the system as a whole. In modern residential and campus broadband networks, the downstream and upstream bandwidth can generally be sufficient to stream at least one movie, e.g., at least 1 Mb/s for TV-quality viewing. If the upstream bandwidth is not sufficient to stream one movie, then the P2PVoD system cannot use that particular STB peer as a primary video content-sourcing playback "parent" for another STB peer (as explained further below), but pre-fetching from such an STB peer can still work.

In certain examples, the present P2PVoD system can be operated either by or in cooperation with the STB provider or DVR vendor. In such an example, the P2PVoD system may not provide an incentive for cooperation between entities controlling the network. However, some form of quid-pro-quo mechanism can be included, if desired. Some approaches assume that the cost of bandwidth is significantly lower within the provider's network, as compared to long-distance distribution, which may extend out of the provider's network. The present systems and methods can be configured, in certain examples, to handle users connecting to the system, such as can be modeled using a Poisson arrival rate.

Figure 2:
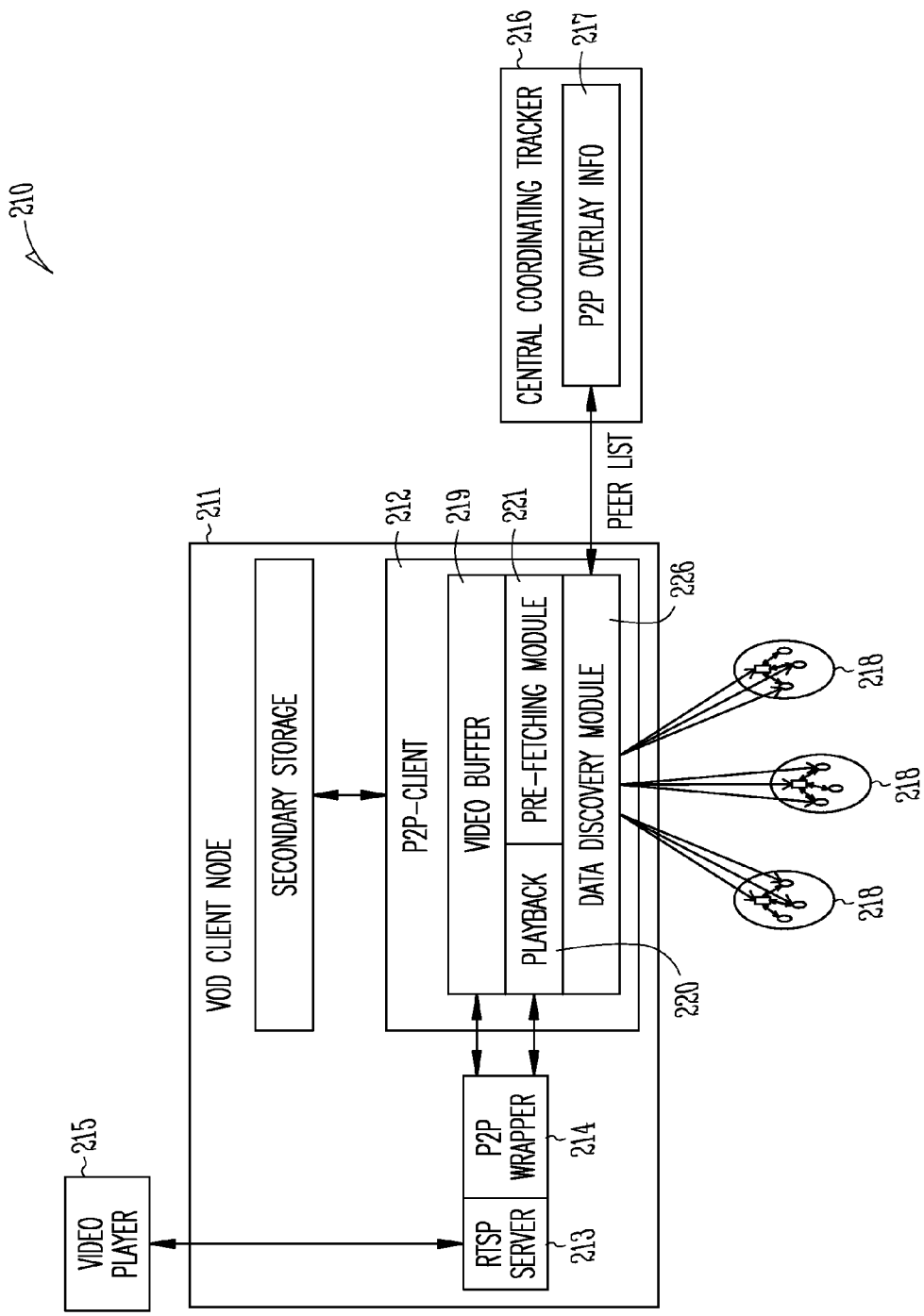
FIG. 2 shows an example of portions of a VoD system.

FIG. 2 shows an example of portions a P2PVoD system 210. In this example, the system 210 includes a STB VoD Peer Node 211. In this example, the VoD Peer Node 211 can include a P2PClient 212, an RTSP server 213 with a P2P Wrapper 214, a local video player 215, and a central tracker 216.

In an example, the RTSP server 213 can be configured to provide video content to the video player 215, to which it can be communicatively coupled. In certain examples, the RTSP server 213 can include an Open live555 RTSP streaming server, and the RTSP server 213 can load the P2P client 212 (e.g., as a library) in the STB VoD Peer Node 211. The P2P Wrapper 214 can serve as an interface between the RTSP server 213 and the P2P client 212.

In the example of FIG. 2, the P2PClient 212 can include a video buffer 219, a playback window module 220 (sometimes referred to herein as a "playback module"), a pre-fetch module 221 and a data discovery module 226. In this example, the data discovery module 226 of the P2PClient 212 can first contact the central tracker 216, such as to obtain information about other STB peer nodes 218, such as what other STB peer nodes 218 in the pool of other STB peer nodes 218 are available, which other STB peer nodes 218 store which chunks of content, which other STB peer node 218 is serving as a playback parent (as described further below), which other STB peer nodes 218 are fastest at downloading content, or the like. In an example, the central tracker 216 can include P2P overlay info 217, and can also directly contact one or more other STB peers 218 to get desired video content data, such as by sending out chunk requests. Received video content data can be stored by a client STB peer 211, such as in a specified file within a video buffer 219. The RTSP server 213 can read the video buffer 219. The video buffer 219 can also be used to serve video content data to one or more other peers 218 in the pool. In an example, the RTSP server 213 can first inquire about the availability of video content data in the P2P client 212. If such video content data is available in the video buffer 219 of the P2P client 212, then the P2P client 212 can allow the RTSP server 213 to read the requested video content data. Otherwise, the P2P client 212 can "pause" the RTSP server 213. While the RTSP server 213 is paused, the data discovery module 226 of the P2P client 212 can send one or more requests to one or more peer nodes 218 to get the requested data, which is substantially immediately required by the RTSP server 213, such as for playback and display by the local video player 215. If the substantially immediately needed video content data requested by the RTSP server 213 is already available in the video buffer 219 or elsewhere in the P2P client 212, then, in an example, the P2P client 212 can optimistically request the next sequential segment of video content data that is not already available at the P2P client 212.

When the RTSP server 213 has read the substantially immediately required data from the video buffer 219 (or obtained by the P2P client 212 from another STB peer 218 in the pool, the RTSP server 213 can start streaming such video content to the video player 215, such as by using the RTSP protocol.

The P2P wrapper 214 can include one or more primitives to assist the RTSP server 213 to read the video content data through the P2Pclient 212, such as, for example, to check whether the video content data is available in the video buffer 219 of the P2P client 212, before initiating a request by the P2P client 212 to another STB peer node 218 for the video content data requested by the RTSP server 213.

As explained further below, to increase or maximize download rates, such as across the entire pool of STB peers in the system, nodes can request individual blocks of video content data from different peers, rather than requesting entire chunks. The particular chunk and block sizes will affect control over request rates, and will affect the system's ability to reduce or minimize overhead associated with control traffic. In an example, the smallest unit of video content data that can be requested from another STB peer 218 is a single block of a chunk. In an example, block size can be fixed at 16 KB, e.g., for current technology, as the present inventors believe that under certain circumstances, downloading video content data units over TCP can result in competing with other chunk downloads, such as by increasing the total time for delivering a chunk. The system can be designed (such as by establishing certain fixed block and chunk size values) so as to increase or maximize the overall video content distribution throughput of the system, rather than attempting to obtain faster video content distribution throughput for one or more particular individual STB peers 211 or 218. Fine-grained control of content requests (e.g., allowing single or multiple block or chunk requests) can help the system to dynamically adapt to the sharing of bandwidth between high priority and low priority requests for video content.

In an example, the P2P client 212 can provide the video content data for the streaming RTSP server 213 by interacting with one or more other STB peer nodes 218, or the central tracker 216, such as to intelligently identify the video content data to be fetched, or the source STB peer node 218 from which to fetch such video content data, so that the video content data can be received at the local STB peer node 211 before the playback deadline of the video content data. In an example, the P2P client 212 can also concurrently monitor anticipated video content data requests, such as to increase or maximize download bandwidth.

In the example of FIG. 2, the P2P client 212 can include the playback window module 220 and the pre-fetching module 221. In an example, the playback window module 220 and the pre-fetch module 221 can act concurrently, but substantially independent of each other, in respectively downloading video content data from other STB peers 218. The playback window module 220 can download video content chunks that are substantially most immediately needed by the RTSP server 213, in an example, such as for maintaining the streaming video display at the video player 215. The pre-fetching module 221 can download other video content data, such as from any other STB peer 218, in an example. This can use much, if not all, of the residual download bandwidth not being used by the playback window module 220. This can be conceptualized as the entire download bandwidth of the STB peer 211 being shared dynamically between the playback window module 220 and the pre-fetching module 221 based on the "neediness" of the playback window module 220 to download substantially immediately needed video content data to preserve the streaming video display at the video player 215. Such neediness can be a factor that determines the bandwidth used by the playback window module 220 based on the percentage of the video content data soon needed by the playback window 220 that has already been downloaded by the pre-fetching module 221.

Figure 3:
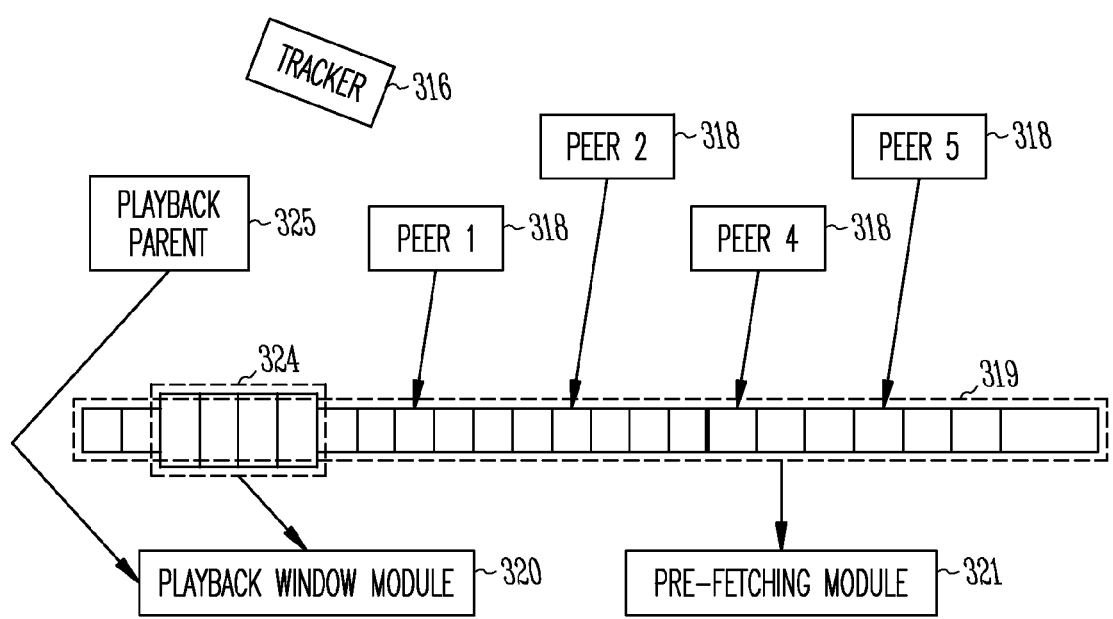
FIG. 3 is a diagram of an example of a P2PClient playback window module and pre-fetch module.

FIG. 3 shows portions of an example of operation of a playback window module 320 and a pre-fetch module 321. In this example, the playback window module 320 can implement a sliding window 324 over the video file buffer 319. In this way, the sliding window 324 can be used by the playback window module 320 to feed quanta (e.g., blocks or chunks) of video content data needed by the RTSP server 213 to service the streaming video display of the video player 215. As such video content data quanta are "consumed" by the video player 215 for display, the sliding window 324 can move forward over the video file buffer 319 to fetch new video content data quanta. The video content data quanta that are substantially immediately needed by the sliding window 324 can be declared to be of high priority. If such high priority data has not already been pre-fetched by the pre-fetching module 321 and loaded into the video buffer 319, then such high priority video content data can be immediately sought to be fetched from one designated playback parent peer 325 that is in communication with the playback window module 320. The pre-fetching module 321 can use any residual download bandwidth of the client STB peer 211 to load additional video content data into the video file buffer 319 from other STB peers 318. A list of peers can be available from and maintained by the central tracker 316, in an example.

In FIG. 2, the playback window module 220 can download one or more blocks or chunks of video content data sequentially from a designated (e.g., single) playback window parent (such as further explained later) with high priority. The playback window module 220 can attempt to maintain availability the next few frames of video content data substantially immediately needed by the RTSP server 213, such as by optimistically fetching ahead of a current read pointer of the RSTP Server 213. The number of outgoing requests for video content data can be determined by the percentage of the data substantially immediately needed by the RSTP server 213 that has already been pre-fetched by the pre-fetching module 321 of the P2P client 212 of the STB peer 211.

During an initial startup phase of the P2P client 212, no video content data will be available for a given request by the RSTP Server 213. Therefore, the playback window module 220 of the P2P client 212 initiates high priority requests for such initial video content data. As the media session progresses, however, the pre-fetching module 221 will have downloaded some of the video content data into the video file buffer 219, 319 of the client 211 STB peer 211. Hence, the bandwidth used by the playback window module 220 will gradually diminish, but will dynamically adapt based on the video content data that has already been downloaded. In an example, when the RTSP server 213 tries to read a single frame of data, the P2P client 212 sends out requests for the requested frame and four immediately sequential chunks (or other quanta) of video content data, which can be referred to as the playback window chunks.

The size of the sliding window 324 serviced by the playback window module 320 can affect how well a minimum downloading rate of video content data can be maintained. The sliding window can be conceptualized as sliding forward at the rate of video encoding or playback. It is believed that 80% of a video display user's forward seeks are to locations within the next 300 seconds of the video. Therefore, in an example, the sliding window 324 is sized to be capable of buffering at least about 300 seconds of the video. The sliding window 324 can buffer all of the chunks (or other quanta) within the sliding window 324 in an order of preference. For example, preference can be given for chunks approaching the chunk deadline soonest. When the sliding window 324 is full, it can move forward, such as by one chunk every time a chunk of the video content data is consumed for display by the video player 215. When more than 90% of the sliding window 324 is empty, then multiple connections (e.g., to different other peers 218) can be used, such as to maintain a specified minimum downloading rate. Such buffer underflow can occur, for example, when the user does a VCR operation (e.g., "rewind" or "fast-forward" to an un-buffered location in the video content file.

Even when preserving a minimum downloading rate of the sliding window 324 helps in real-time video viewing, simulations show that due to pre-fetching and increasing the content buffering time (e.g., of a 90 minute movie file to 1000 minutes from 200 minutes), the present system can be configured to serve a certain number of nodes in the system at an uploading bandwidth rate of about 1 Mb/s. Earlier the same number of nodes could only be served with 4 Mb/s of uploading rate with a TTL of 200 minutes. The pre-fetching module 221, by buffering the video content data for a longer time, can help to reduce the uploading bandwidth needed by the playback module 220 to one-fourth of its previous rate. This is a significant saving of the uploading bandwidth needed for content providers. The large storage capacities of the STBs can help us in managing large crowds by just increasing the buffering time (e.g., TTL, for a given uploading rate). This kind of cost savings on bandwidth usage and ease of load-balancing can provide a significant advantage.

The inventors tested using different numbers of chunks in the sliding window 324. In certain examples, when the number of chunks fetched by the sliding window 324 was less than four, the RSTP Server 213 would "starve" (e.g., run out of video content data) when the download of video content data from the designated playback parent STB peer 218 took slightly longer than usual. If the playback chunk fetching by the sliding window 324 was more than four chunks, the playback window module 220 of the P2P client 212 initiated so many additional requests for content that the pre-fetching module 321 was left with little (if any) download bandwidth. This effectively rendered the P2P client 212 a sequential fetching device, thereby reducing the scalability of the system.

In some examples, a data discovery module 226 of a P2P client 212 can selects one other STB peer node 218 in the pool to be designated as the high priority peer. This particular designated one other STB node 218 can be referred to as the designated playback window parent. The playback window parent can be selected such that its playback pointer (e.g., the parent playback pointer) points to video content data that is sequentially ahead of the downloading child node's playback window pointer (e.g., the child playback pointer). When the playback window parent is selected, preference can be given to selecting a parent having stored all the video content data chunks needed for downloading when requested by the child playback window of the requesting child STB peer 211. This information can be obtained by the requesting child STB peer 211 from the central tracker 216 before the parent other STB peer 218 is selected.

In some examples, the system is configured such that any given downloading child STB peer node 211 can only designate one playback window parent other STB peer 218. In some examples, a playback window parent STB peer 218 is only allowed to serve as a parent for a single requesting child STB node 211. The P2P client 212 requests and downloads video content data chunks in the temporal vicinity of the playback pointer of the RSTP Server 213 of the requesting child STB node 211. If the current playback pointer location's chunk and the next sequential chunk are not locally available, which can sometimes happen, such as at startup or due to bandwidth fluctuation, the P2P client 212 can respond by canceling all chunk requests except the high priority chunk requests to the playback window parent. This effectively frees up download bandwidth of a client STB peer 211 for substantially immediately needed chunks.

In certain examples, the designated playback window parent STB peer node 218 monitors the download request queue of its designated requesting child STB peer node 211. If the number of pending requests indicates that none of the substantially immediately needed playback window chunks are available at the requesting child STB peer node 211, then the playback window parent STB peer node 218 can cancel one or more lower priority requests from other requesting STB peer nodes (e.g., other than the parent's designated child). This effectively frees uploading bandwidth of the parent for use by the parent's designated child STB peer node 211.

In some examples, the pre-fetch module 221 can complement the download capability of the playback window module 220. For example, the pre-fetching module 221 can use some or all of the residual download bandwidth to request video content data chunks that are missing in the local buffer 219. When the download bandwidth available exceeds the video encoding/streaming rate, the pre-fetch module 221 can concurrently download video content data chunks with lower priority, while the playback window module 220 downloads the substantially immediately needed video content data chunks with higher priority. Both the playback window module 220 and the pre-fetch module 221 can therefore concurrently download video content data to the video file buffer 219.

In an example, all the other STB peer nodes 218 can be uploading video content data chunks to more than one requesting client STB peer node 211 node. Therefore, the uploading bandwidth of a particular STB peer node 218 can be split across multiple downloading client STB peer nodes 211. In some examples, the playback window module 220 of a downloading STB peer node 211 can initially open a single connection to a particular serving STB peer node 218, and can maintain a particular minimum downloading rate, which can slightly exceed the video encoding/playback rate of the downloading STB peer node 211 in order to inhibit or prevent the video player 215 from running into an empty video file buffer 219 (e.g., starving). In some examples, when the downloading rate drops below a specified minimum threshold value, then the playback window module 220 can respond by then opening multiple connections to different serving STB peer nodes 218 to download the substantially-immediately needed chunks. In some examples, when the downloading rate drops below a specified minimum threshold value, then the pre-fetching module 221 can then respond by opening multiple connections to different serving STB peer nodes 218 to download video content data chunks. In either case, the particular serving STB peer nodes can be selected at least in part by using information about the previous downloading speed. Such information can be obtained from the central tracker, in an example, or maintained locally (e.g., based upon past transaction experience) at the downloading STB peer nodes 211. Maintaining an adequate downloading rate that exceeds the minimum downloading rate will help provide a good viewing experience for a viewing user of the video player 215.

To prepare to help download video content chunks to the local video buffer 219 of P2P client 212 of the downloading STB peer node 211, the pre-fetching module 221 can identify locally missing video content data, and can then select a peer from which to download the missing video content data. The overall downloading performance can be affected by the performance of the pre-fetching module 221. As the total download bandwidth available to the P2P client 212 is rarely known and often fluctuates, various examples can provide an adaptive pre-fetching rate, such as according to the following:

```
queue_size = queue_time * current_block_download_rate;
if (queue_size > MAX_QUEUE_SIZE)
    queue_size = MAX_QUEUE_SIZE;
if (queue_size < MIN_QUEUE_SIZE)
    queue_size = MIN_QUEUE_SIZE;
num_requests = queue_size − download_queue.size( ) −
    request_queue.size( );,
``` where queue_time refers to the length of the request queue (e.g., given in the number of seconds it should take for the other STB peer 218 to send all the data), and download_queue.size( ) and request_queue.size( ) return the respective size of the queues.

In some examples, MAX_QUEUE_SIZE and MIN_QUEUE_SIZE are set at specified values, such as 48 and 2, respectively.

In some examples, the total number of pre-fetching requests can be determined using a time-based deadline that can serve to limit the total duration any request spends being open in the request queue. If the incoming request rate is equal to the processing rate, then the queue length will remain constant. In some examples, in order to help avoid starvation of a request, a time-based deadline can be set, by which time the request needs to be processed by the other STB peer node 218. This can help, such as when sending many concurrent requests to multiple other STB peers 218 for helping increase or maximize utilization of the download bandwidth of the requesting client STB peer 211, while maintaining a strict temporal deadline by which particular requests are to be processed.

Along with computing the number of requests to be sent, the pre-fetch module 221 or the data discovery module 226 can also help identify video content data blocks or chunks available at one or more other STB peers 218, and determines a particular STP peer 218 from which to download particular video content data chunks to maintain high utilization of the download bandwidth, which, in turn, enhances scalability. An example of a technique for chunk and peer selection can be described as:

```
partial_chunk_list = partial_downloaded_chunks(chunk_map)
if(partial_chunk_list.empty( ) != true)
    {interesting_chunk = find a chunk in the partial_chunk_list
with the least number of blocks required to complete its download}
    else
        interesting_chunk = −1;
    if (interesting_chunk == −1)
```

-continued

```
{interesting_chunk = rarest chunk in overlay}
while (num_request >0)
    reqst_peer = max_down_rate(interesting_chunk)
    num_request =
    reqst_peer.send_request(interesting_chunk.free_blocks( );.
```

The above technique can be used to prioritize video content data downloads. In some examples, partially downloaded video content chunks can be given higher priority then other downloads. In some examples, the pre-fetching module 221 can avoid or preclude downloading video content data from the designated playback window parent STB peer node 218, instead selecting one or more other ones of the STB peers 218 from which to pre-fetch video content data. In some examples, if more than one partially downloaded chunk is identified, then a partially downloaded chunks that is very close to download completion can be given priority over another partially downloaded chunks that is farther from download completion.

In an example, if no partially downloaded chunks are identified, then the rarest/random chunk of the desired video content file is first selected to download. The rarest/random chunk is that which is stored by the fewest other STB peers 218 in the pool. This rarest/random chunk first strategy can help to propagate and distribute rare content among the STB peers in the pool.

In an example, once a desired chunk of video content data has been identified, then the pre-fetch module 221 can identify a serving STB peer 218 from which to download the desired chunk of video data content. In some examples, the P2P client 212 of the downloading STB peer 211 can monitor the download rate of each serving STB peer 218 communicating with the pre-fetch module 221. If the desired video content data chunk is available at more than one STB peer 218 in the pool, then the pre-fetch module 221 can selects one or more STB peers 218 for use in downloading based at least in part on its historical download rate, such as relative to that of other STB peers 218 buffering that particular desired chunk. Where the download bandwidth of the client STB peer 211 is limited by its playback window module 220, additional connections established by its pre-fetch module 221 can diminish downloading speed across any established connection. Thus, in certain examples, the pre-fetch module 221 can recognizes when the downloading bandwidth of the STB peer 211 is being limited by its playback window module 220 and, in response, its pre-fetch module 221 can dynamically manage its connections to other STB peers 218 accordingly, such as to increase the download performance of as many of its connections as possible, in certain examples.

Figure 4:
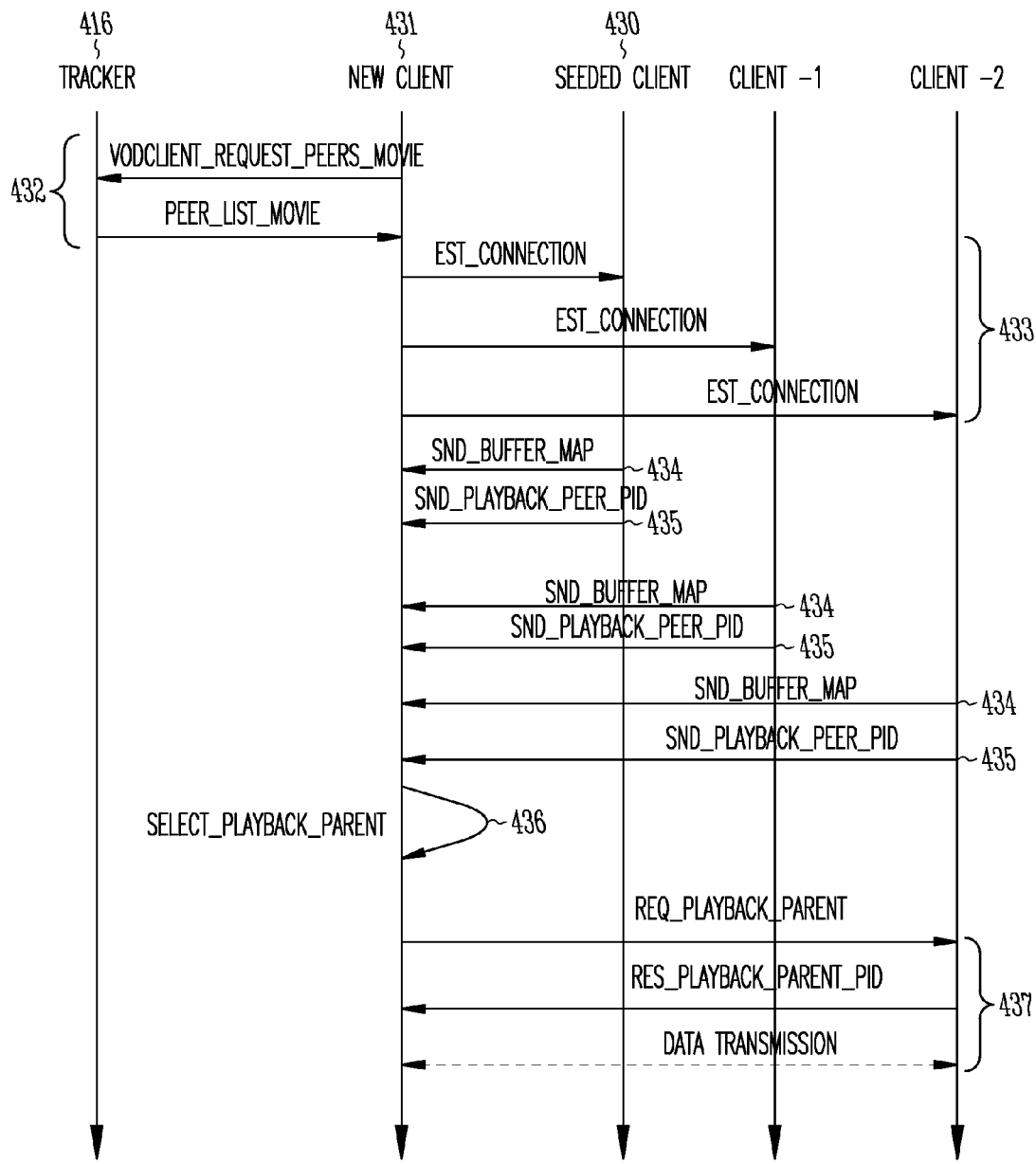
FIG. 4 shows an example of a communication map of a P2PVoD system.

Upon identification and selection of a STB peer 218 having the identified desired chunk of video content data, the pre-fetch module 221 can send out a number of requests, such as using the technique shown in FIG. 4 for increasing or maximizing the utilization of any residual bandwidth available for downloading.

To recap, this approach of two modules (e.g., playback and pre-fetch) downloading can provide timely delivery of needed video content data. The pre-fetching can help enhance the efficient usage of network resources, and can help provide robustness to the P2P network by distributing the content faster than other approaches, such as an approach that does either a sequential fetch of the content, or that streams it from multiple peers. The presently-described active pre-fetching by a separate module can permit the entire video file to be buffered in the system during the initial few minutes of a movie, giving the user considerable leeway in doing a random seek without any jitter. The active pre-fetching can help enhance robustness of the network and can help provide a better user experience. Simulations for goodput show that during the switching of nodes, pre-buffering in local nodes can avoid jitter better than other approaches. Another enhanced feature of the present systems and methods for VoD service is the provision for VCR operations. Consider the scenario when the user is watching the video at the $10^{th}$ minute of the movie; the sliding window 324 will buffer the immediately needed video chunks. But suppose that the user suddenly wants to jump over to the $40^{th}$ minute of the movie. Now, the playback window module 220 immediately jumps over to the $40^{th}$ minute of the movie and tries to retrieve the video chunks corresponding to the position of the sliding window 324 for the $40^{th}$ minute of the video. Experiments observing user interactions appear to indicate that the number of forward seeks or VCR operations increases with the progress of a session. Active pre-fetching of the entire content helps in serving the increased forward seeks without any jitter.

Various approaches can seek to decrease or minimize the probability of glitches during regular playback during VCR fast-forward and skip-ahead operations by maximizing the amount of download data. However, without provisions, lower-priority streams for the same household can reduce the throughput of a higher-priority stream if they share the same bottleneck link. This can be conceptualized as self-interference. Certain approaches can use mechanisms to decrease or minimize this problem, including for example, DiffServ, probing, or using multiple streams. Using DiffServ, for example, the system can mark higher lower-priority packets accordingly, so that routers can give packets appropriate scheduling and dropping priority. Many home routers support DiffServ and some 802.11 access points also use DiffServ markings for prioritization, using 802.11e.

Probing can operate such that if a stream for the chunk that is being viewed is receiving insufficient bandwidth, the client can suspend the lower-priority streams and observe if the suspension increases the bandwidth of the high-priority stream. If so, this indicates that these streams are competing for the same bottleneck bandwidth. In such situations, it is counterproductive to use multiple streams.

The third approach can create multiple TCP connections and retrieve the different chunks from different peer nodes. (Protocols such as RTSP allow random access within a file, so that random access can be supported.) For example, Web browsers are able to routinely create up to four concurrent TCP connections to fetch both HTML and image content for a page.

In some scenarios, if chunks for a seek operation have not been fetched, the user would experience a delay while the chunks are being fetched. In some examples, certain key/popular frames forming 5 continuous seconds of video at regular intervals (e.g., of 1 minute) of video can form anchor points, which can be downloaded during startup. Most of a user's forward seeks would also be to these key frames, which can be served immediately using the chunks buffered in anchor points. If the user's seek is not to the exact anchor point, the sliding window can be adjusted to the nearest anchor point. Thus, a random seek can be immediately satisfied without any delay and the 5 seconds of the playback time can be used to download the rest of the sliding window. Using such anchor points can also help in supporting the movie sampling by user when they scan through the video, much like the "intro-sampling" mode supported by portable CD-players.

Results from experiments on user-behavior show that the most popular video content have smaller session lengths, where most of the users would have seen the most popular video before, either through another medium (theater or DVD) or in a prior VoD session. In most of these smaller sessions, the users tend to just scan through the entire video. Downloading of anchors (e.g., key-frames) and most popular chunks, based on user behavior can help in serving the chunks faster, when the user scans through the entire video file.

Scheduling policies define how to discover the available chunks, what chunks to download and where to download the chunks from. One or more of these policies can affect the overall performance of the entire VoD system as they define the amount of control messages being passed around the system and they also decide the efficiency and the timely delivery of the data received by the nodes.

In some examples, for every movie published by the VoD service, there can be a global distributed hash table (DHT) formed by all the nodes in the overlay that buffer the movie content. This can be referred to as a chunk map. Initially the entire movie can be stored in the source servers and all the chunks can be sourced from the source server. As the STBs download the chunks, however, they can update their position in the DHT with all the chunks available in them, and can remove the node from the DHT when the node leaves the network. One node in the overlay can be responsible for a specified range of chunk IDs of the video file in the DHT. This node can maintain a list of all the other nodes that have buffered the chunks of the IDs falling within its ID space. Whenever a STB wants to download a certain chunk, it can search through the DHT and get a list of all the nodes in the overlay that have buffered the required chunks.

Three types of chunks can distinguish that a viewer can retrieve while watching a movie. The first type of chunk is the one currently being watched, which clearly should have the highest priority to avoid disruptions in playback. This retrieval should proceed at least as fast as the consumption rate for the current chunk; if the download speed is larger, the content is buffered to compensate for any future glitches in delivery. The other types of retrievals make it more likely that VCR operations suffer minimum delay. The first type of pre-fetching obtains key frames for the whole movie, allowing smooth fast forward operation. For MPEG-encoded movies, this would typically be $\frac{1}{15}$ of the frames of the movie, albeit a larger fraction of the byte volume. The lowest priority can be given to prefetching chunks ahead of the current one. This can either be done sequentially, or the system can sample viewing histories to determine if a certain DVD chapter, for example, is far more popular than others. Instead of downloading a single segment (set of continuous chunks, forming a few minutes of the video) as a whole, we can make use of the fact that viewers jump to the beginning of a chapter or scene. Thus, the system can first download the first few chunks of each segment, enough to allow the system to stream the now-current segment without disruption. This striping con be repeated for each of the segments. Since the three types of downloads are likely to come from different sources and download bandwidth is likely to be higher than upload bandwidth, the total available bandwidth for the viewer will be larger compared to pulling data from a single source. This policy also address the observation that users are more likely to skip ahead during later parts of a movie. At that time, more of the movie will be pre-cached at the viewer's STB. Once the nodes decide on the chunks to download, it can query the chunk-map or the global DHT for STBs that buffer these required chunks. The chunk-map returns a set of STBs buffering these chunks. The STB offering more uploading bandwidth among all the peers within the same subnet or AS (Autonomous System) can be selected for downloading of the chunks.

In an example of the present architecture, a local DHT maps movie names to peer content identifiers as well as the server-based URL, should there be no available local copy at the client STB peer 211 or if all other STB peers 218 holding copies are otherwise busy. Since each chunk is likely to be held by multiple STB peers 211, 218, a receiver STB peer 211 can decide which other STB peer 218 to contact. In general, the selection process can avoid hot spots and can favor short transmission distance between serving STB peer 218 and the downloading STB peer 211. Once a chunk comes over to a STB peer node 211, 218 within the subnet it can be exchanged locally, reducing the expensive cross AS traffic.

In some examples, the playback window module 220 can attempt to get the chunks needed by the sliding window 324 before their corresponding chunk deadlines expire. In some examples, the playback window module 220 can first search for the desired chunk from other STB peers 218 within the subnet, such as by searching through a DHT. If the desired chunk is not available, then the playback window module 220 can search for the desired chunk in other subnets, such as by searching through the DHT. In some examples, the playback window module 220 is not able to get the desired video content data chunk from within the overlay network, however, it can get still the desired chunk from another server, such as a source server. In order to maintain a fan-out limit for each server and to inhibit excessive crowding at the source, some examples can impose a limitation can on the maximum number of requesting STB peers 211 that can concurrently try to fetch a chunk from a single serving STB peer node 218. The priority can be given to the playback window module 220 connection over a pre-fetching module 221 connection. If a particular STB peer node 218 is at the fan-out limit and the playback window module 220 requests a chunk of video content data, then the playback window module 220 can preempt one of the pre-fetching module 221 connections and allow the playback window module 220 connection to fetch the required chunk. The differentiation of the playback window module 220 and pre-fetching module 221 connections can be done in certain examples using port numbers. In some examples, the pre-fetching module 221 joins the same DHT as the playback window module 220, and gets the same STB peer nodes 218 for downloading of chunks. In such an example, both of the playback window module 220 and the pre-fetching module 221 can download a chunk from a selected STB peer node 218 that has been providing more upload bandwidth than the other STB peer nodes 218.

Biased neighbor selections, in which a requesting STB peer 211 chooses the majority, but not all, of its neighbors from STB peers 218 within the same subnet, can reduce expensive cross-subnet or cross-AS traffic significantly. Video content data exchanges can be biased to prefer that they be completed between local STB peer nodes 211, 218. Based on existing DSL and cable architectures, it is likely that there can be three "rings" of proximity, such as, for example, peers within a single household, peers within a subnet sharing the same router, and peers sharing an AS. In some examples, STB peer nodes 211, 218 in the same subnet can be identified using the common prefix of the IP addresses. When a location-aware selection of serving STB peers 218 is adopted by the STB peers 211, a chunk need come over to the subnet only once, and then it can be duplicated within the subnet as needed.

Always choosing the first most-local STB peer node 218 from the list can lead to admission control failures. Therefore, in an example, the client STB peer node 211 can choose a random STB peer 218, excluding those STB peers 218 that the client STB peer node 211 is already using for retrieving other chunks.

In some examples, if a requesting STB peer node 211 has failed to gain admission to any peer with the desired chunk, and if the desired chunk is the currently-playing one, or is substantially immediately needed, a requesting STB peer 211 can set a "last resort" flag and retry the candidate STB peers 218. STB peers 218 then serving non-current chunks can then remove one or more requesting STB peers 211 that are using that STB peer 218 to pre-fetch chunks; such other requesting STB peers 211 can retry elsewhere. In such an example, the playback window module 220 connection can preempt other connections. It is likely that a displaced requesting STB peer 211 is generally watching a popular movie, and can readily find another serving STB peer 218 to provide the video content data The data discovery module 226 in FIG. 2 can maintain a map of all the chunks available in the overlay along with the STB peer nodes 218 buffering these chunks. In an example, the data discovery module 226 can persistently exchange a buffer map with other STB peer nodes 211, 218. The buffer map can include an array of bits describing the availability of chunks in a STB peer node 218. In an example, the data discovery module 226 can exchange the buffer map of the chunk availability, but not the blocks available within any particular chunk; this can reduce the control traffic rate. In an example of the chunk selection technique, the pre-fetch module 221 can download partially completed chunks first; the buffer map can indicate only complete chunks of video content data, in some examples. Therefore, providing priority to completing downloads of partial chunks can help keep the system populated with as diverse a selection of video data content as possible, and can reduce the amount of partial chunk data spread about the system and unavailable for exchange. In some examples, the data discovery module 226 can also send its playback child node PID to the other STB peers 218. In some examples, the data discovery module 226 can receive the node PID of the most current playback child of the various STB peers 218. Having the buffer map information and node PID of peer child can help the P2P client 212 of a particular STB peer 211 service random seeks by one or more other STB peers 218, when the local P2P client 212 has to identify another serving STB peer node 218 having the randomly requested part of the file available and also not serving any other requesting STB peer node 211 as its designated playback parent. Using the chunk map, the P2P client 212 can identify the set of other STB peers 218 having the requested video content data and whether such other STB peer 218 is then serving any other requesting STB peer 211 as its playback parent. In an example, if no childless STB peer 218 is available, then the playback window 220 of the P2P client 212 of the requesting STB peer 211 can switch to a "swarming" download technique in which the requesting STB peer 211 can aggressively start to download the desired chunks from a set of multiple STB peers 218, such as those then providing the highest identifiable download rates.

In some examples, the data discovery module 226 can provide locality-aware video content data acquisition, such as in which the data discovery module 226 selects another STB peer 218 within the local DSLAM 102 as the designated playback parent peer. Generally, up to 80% of the total video content data can be served from within the subnet of STB peers that are communicatively coupled to a local DSLAM 102. If requested video content data is not available on any peer 104 within the local DSLAM 102, then the data discovery module 226 can select a node outside the local DSLAM 102 from which to fetch the desired video content data. As the video content data is mostly fetched from STB peer nodes 104 within the local DSLAM 102, the system can generally be substantially immune from external interruptions to service quality, such as congestion or jitter introduced due to long-distance transmission of video content data.

Examples of the peer-assisted VoD system described herein have been illustrated implementing the RTSP server 213 using a modified open-source Live555 streaming server. FIG. 2 shows an example in which a communicating interface layer, such as the P2P wrapper 214, can be included. The P2P wrapper 214 can include one or more primitives to help the RTSP server 213 read the data through the P2P client 212 or to check whether desired video content data is locally available before requesting the data from another STB peer 218. In an example, if the desired data is not locally available, the RTSP server 213 can pause (e.g., for a few seconds), such as by stopping the video feed for the video player 215. The RTSP server 213 can then recheck with the P2P client 212 whether the desired data has been locally received. Certain examples can use other implementations of the RTSP Server 213 (e.g., Videolan), but can similarly include a P2P wrapper 214 to interface the RTSP Server 213 with the P2P client 212.

In some examples, the central tracker 216 resides at a specified node 104 and tracks STB peers 211, 218 available on the system. In an example, upon connecting to the system, every node 104 contacts the central tracker 216, such as to receive overlay information. In some examples, overlay information of all the peers 104 in the system can be sent when the central tracker 216 is contacted. In some examples, the central tracker 216 can be modified to concurrently support multiple movies. In such an example, the central tracker 216 can send a peer list based on the particular movie requested. Location-aware content discovery can also be controlled by controlling the peer list from the central tracker 216.

In some examples, the P2PVoD system 100 can define a protocol to communicate with other STB peers 104, such as for exchanging the buffer map and the video content data. STB peers 211, 218 can communicate with the central tracker 216, such as to periodically or recurrently fetch a list of peers. For communicating with the central tracker 216, STB peer nodes 211, 218 can send or receive messages, such as by using hypertext transfer protocol (HTTP). In an example, the P2PVoD system 100 can use five different request/response messages, such as to allow a node 104 to communicate with other nodes 104, such as to exchange information and download video content data. In an example, such protocol messages can include: BUFFERMAP, PIECE, CANCEL, REQ_ PLAYBACK_PARENT and PLAYBACK_PEER.

In this example, the BUFFERMAP message can request a serving STB peer 218 to send the requesting STB peer node 211 the map of chunks of video content data currently being buffered by the serving STB peer 218. In responding to a BUFFERMAP message, serving STB peers 218 will only return the list of complete chunks then being buffered, in an example.

The PIECE request message can request that a serving STB peer 218 send a block in a chunk of video content data, such as based on its availability. A serving STB peer 218 receiving a PIECE message can respond with the actual block of the video content data, e.g., if it is available, or else the serving STB peer 218 can ignore the PIECE message. If a requested piece has not been received by a requesting STB peer 211, and it is no longer needed, a requesting client STB peer 211 can cancel the request, such as by using the CANCEL message. In an example, PIECE and CANCEL request messages can specify the applicable chunk number and a corresponding block number. PIECE response messages can include the actual requested piece of video content data along with the corresponding chunk and block numbers. In this example, the CANCEL message has no response message.

REQ PLAYBACK PARENT message requests a first peer to be the requesting peer's playback parent. If the first peer is not the playback parent for any other node, it will respond back with the PID of the requesting peer. If the first peer is unavailable to be the requesting peer's playback parent, the first peer responds back with ND of the peer to which it is already a playback parent.

FIG. 4 shows an example of a communication map of an example of the P2PVoD system 100. In this example, the P2PVoD system 100 can include a central tracker 416, a seeded P2P client 430 which stores a complete movie and a new P2P client 431 that doesn't have the movie file, but will be downloading from other STB peers to play the movie.

In this example, the new P2P client 431 can join the overlay, such as by contacting the central tracker 216, which can return a complete list of which peers are then buffering all or part of the movie 432. Upon receiving the list of peers, the new P2P client 431 can begin to establish connections with one or more peers, such as shown at 433. Upon connecting to a peer, the new client 431 can send a HANDSHAKE message providing its PID (peer identifier) to the peer, such as shown at 434. The peer that receives the Handshake message can responds with its buffer map and its playback child's PID, such as shown at 435. In this example, after receiving the buffer maps and PIDs of the playback children of all other peers, the new client 431 can select a particular peer, such as shown 436, which is not then serving as a designated playback parent, and which also includes the desired video content data to serve this new client 437. In the illustrated scenario, the new client 431 can establish a connection with the seeded client 430, client-1 and also client-2. In the scenario shown, the seeded client 430 and client-1 both respond back with valid PIDs of their playback children. Only the client-2 responds with a dummy playback child's PID, indicating that client-2 is not serving as a designated playback parent to any other peer. In the scenario shown, the new client 431 can select the client-2 as its designated playback parent. In some examples, if more than one peer is available that is not serving as a parent, the client peer can select a serving peer node that includes the desired chunks, but which includes the least number of chunks buffered. In some examples a peer that is geographically close to the new node can be preferred for selection as the designated playback parent. In this example, a node can serve as a parent to only one other node. A P2P client can requests the data needed by its playback module 200 from its designated parent, and can use residual bandwidth available to perform pre-fetching. When a node assumes the role of designated parent for a peer, it can publish this information to all the peers. This can help decrease or minimize requests for that particular node to be a designated parent.

Published parent peer status also helps a client identify which nodes are free to provide video data content during a fast-forward or other VCR operation. In some examples, when a user invokes a VCR operation, and when the local client does not have the video content data requested, and when such requested content is also not available in the local client's designated playback parent, the local client can search through the remaining peers and select another peer to be its designated playback parent. Upon selecting a new playback parent, the client can begin downloading the requested video content data.

Figure 5:
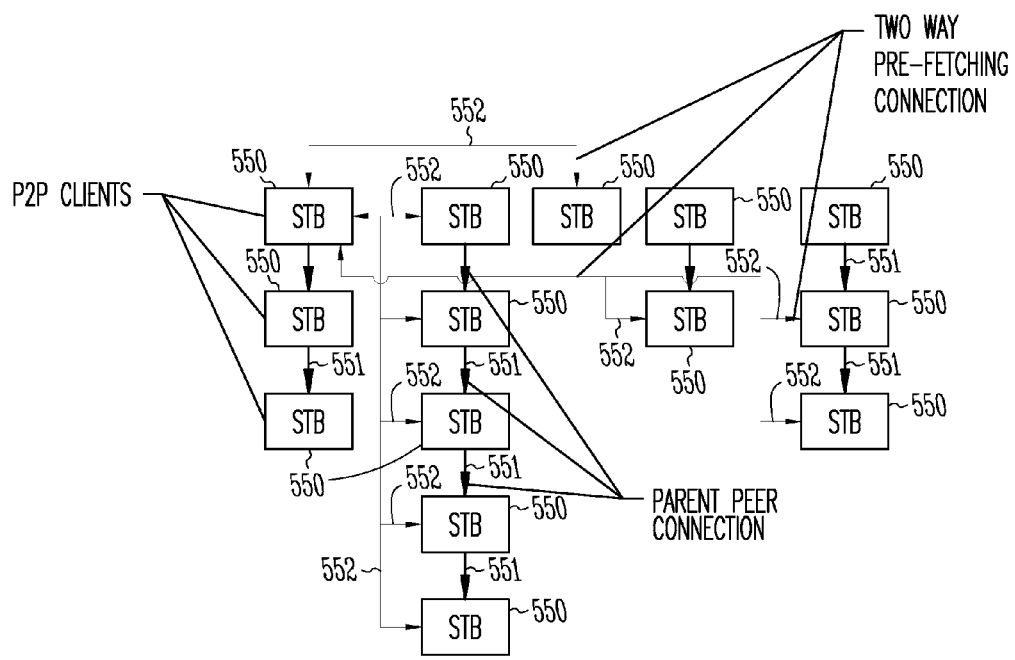
FIG. 5 shows an example of a P2P overlay.

FIG. 5 shows an illustrative example of a P2P overlay. In this example, once all the P2P clients 550 establish their primary (designated parent) 551 and secondary (all other peers) 552 connections, the P2P network can organize into an overlay similar to that shown in FIG. 5.

In an example, admission of a new incoming peer can be verified so that the admission of the new peer will not lead to performance degradation, such as in which admission of one stream results in a large number of subscribers experiencing degradation of the video signals. One way of avoiding a widespread perceived outage is by using integrated admission control. If a video session cannot be supported due to oversubscription anywhere in the network or service, this integrated admission control can deliver a "could not be serviced at that time" signal to the requesting STB. Certain examples can include a distributed admission control, such as in which the admission of a new node depends on the extent to which the entire video content is distributed in the network, and the number of source nodes available. In an example, when a new node requests a movie, the client software can buffer the initial segments corresponding to the size of sliding window and the anchor points during the initial startup. If it is not able to meet the required minimum threshold downloading rate, and the startup delay exceeds the maximum permitted threshold duration, then the P2P overlay can be said to be "crowded" and the admission of new nodes can be avoided or precluded. This can permit adding new source nodes at run time by updating the global DHT for the movie with new source nodes, such as when the content provider detects the degradation of the video signal to the existing subscribers with addition of new subscribers to the movie.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A peer-to-peer (P2P) video-on-demand (VoD) method of using a plurality of IP-enabled VoD peers in a pool for providing video content data to a video content data requesting client peer in the pool, the method comprising:

designating, for the requesting client peer, one other peer in the pool as a parent peer for serving high priority playback content of video content that is substantially immediately needed for playback display controlled by the requesting client peer, the parent peer operating as one designated playback peer that is in communication with the requesting client peer to serve the high priority playback content for the playback display at the requesting client peer;

downloading the high priority playback content from the parent peer to the requesting client peer, the high priority playback content including chunks of the high priority playback content within a sliding window over a buffer window used during playback of the video content, wherein the sliding window maintains a minimum length of the video content, and wherein respective chunks of the high priority playback content are prioritized in download bandwidth at the requesting client peer such that the respective chunks are prioritized to be received from the parent peer before a scheduled playback deadline of the buffer window;

downloading, during the downloading of the high priority playback content for the buffer window, low priority pre-fetch content of the video content to the requesting client peer from another peer in the pool other than the parent peer, the low priority pre-fetch content including chunks of the low priority video content outside of the sliding window, and the low priority pre-fetch content including video content segments spaced at regular intervals within the video content, wherein the length of a video content segment is less than the regular interval;

allocating remaining available download bandwidth at the requesting client peer such that download bandwidth at the requesting client peer that exceeds an encoding rate of the video content and that is not used for downloading the high priority playback content from the parent peer is allocated, wherein the remaining available download bandwidth is allocated for downloading the low priority pre-fetch content from the another peer in the pool;

using the requesting client peer, serving for the playback display, video content comprising the high priority playback content and the low priority pre-fetch content by combining the high priority playback content and the low priority pre-fetch content; and when the requesting client peer requests playback at a point of the video content in which playback content has not been downloaded, adjusting the sliding window to a video content segment of the video content segments closest to the requested playback point.

2. The method of claim 1, comprising contacting a central tracker to obtain overlay information of other peers in the pool.

3. The method of claim 1, wherein designating one other peer in the pool as a parent peer comprises:
locating another peer without a designated child peer; and
receiving permission from the located another peer to download video content data from the located another peer serving as the parent peer.

4. The method of claim 1, wherein downloading high priority playback content from the parent peer to the requesting child peer comprises:
monitoring a video buffer pointer; and
requesting sequential video content data at a rate determined at least in part using information about whether the sequential video content data is available in a specified length of the buffer window used during playback beyond a position indicated by the video buffer pointer.

5. The method of claim 4, wherein downloading low priority pre-fetch content comprises downloading video content data corresponding to a video buffer location outside of the buffer window used during playback.

6. The method of claim 4, wherein downloading low priority pre-fetch content comprises including a preference for video content data stored at fewer peers in the pool.

7. The method of claim 1, wherein designating one other peer in the pool as a parent peer comprises selecting the parent peer using information about the previous download rate of video content data of the parent peer.

8. The method of claim 1, wherein downloading low priority pre-fetch content to the requesting client peer from another peer in the pool other than the parent peer comprises selecting the another peer other than the parent peer using information about the previous download rate of video content data of the another peer other than the parent peer.

9. The method of claim 1, comprising selecting a playback information request size value that increases or maximizes video content data transfer efficiency across the pool of peers.

10. The method of claim 1, wherein downloading low priority pre-fetch content to the requesting client peer comprises:
issuing a pre-fetch request to the one or more other peers; and
imposing a time deadline by which a pre-fetch request is to be fulfilled.

11. The method of claim 1, wherein downloading low priority pre-fetch content comprises including a preference for completing downloading of a partially downloaded chunk of video content data over downloading a chunk that has not already been partially downloaded.

12. A peer-to-peer (P2P) video-on-demand (VoD) system comprising:
a controller peer, configured for use in a pool of the peers distributed among a plurality of end-users, the controller peer comprising:
an IP-enabled communication port;
a local video server, configured to be coupled to a local video monitor to serve video content data to the local video monitor for display on the local video monitor;
a plurality of modules executable on at least one processor, the plurality of modules comprising:
a playback module, coupled to the communication port and the local video server, the playback module configured to download, at a first priority from another peer, video content data needed by the local video server for substantially immediate display on the local video monitor by downloading data inside a video buffer for the substantially immediate display, the another peer operating as one designated playback peer that is in communication with the playback module for serving the video content data at the first priority during playback operations of the video content data, wherein respective chunks of the video content data are prioritized in download bandwidth such that the respective chunks are prioritized to be received from the another peer before a scheduled playback deadline of the video buffer;
a pre-fetch module, coupled to the communication port and the local video server, the pre-fetch module configured to obtain at a second priority from one or more peers, lower than the first priority, video content data for less immediate display on the local video monitor by downloading data outside the video buffer for the substantially immediate display, and wherein the pre-fetch module is configured to obtain video content segments spaced at regular intervals within the video content data, wherein the length of a video content segment is less than the regular interval, and the downloading of the data outside the video buffer occurring during the downloading of the data inside the video buffer, wherein the controller peer is configured to allocate remaining available communication port download bandwidth that exceeds an encoding rate of the video content and that is not used by the playback module for downloading video content data using the pre-fetch module;
a data discovery module, including a parent peer memory location configured to designate one other peer in the pool as a parent peer for obtaining from the parent peer video content data with high priority, the parent peer comprising the stored video content data needed by the playback module for the substantially immediate display on the local video monitor, and the data discovery module including an interface configured to communicate with a central tracker to obtain current information about which peers are available; and a video playback pointer used with the video buffer, and wherein the local video server is configured to read video content data of the video buffer and to update the video playback pointer as the local video server provides video content data to the monitor for display, and wherein, when a request for playback is received for a playback point in which video content has not been downloaded, the playback pointer is set to the location of a video content segment of the video content segments closest to the requested playback point.

13. The system of claim 12, wherein the playback module is configured to download specified chunks of a specified video file at a first rate related to available download bandwidth from the parent peer when the specified chunks of the video file are not available in the video buffer and the specified chunks of the video file are within a specified number of subsequent chunks of the video playback pointer.

14. The system of claim 13, wherein the pre-fetch module is configured to download, from the parent peer or another peer other than the parent peer, additional chunks of the video file to the video buffer, wherein the additional chunks of the video file are additional subsequent chunks of the video file beyond the specified number of subsequent chunks of the video playback pointer.

15. The system of claim 14, wherein the pre-fetch module is configured to download the additional chunks from another peer a second download rate determined as a function of the first download rate of the playback module and remaining download bandwidth.

16. The system of claim 12, wherein the pre-fetch module is configured to perform a non-sequential pre-fetch by selecting the other peer using a previous download rate of the video content data by the other peer.

17. The system of claim 12, wherein the playback module is configured to maintain a playback information request size that increases or maximizes video content data transfer efficiency across the pool.

18. The system of claim 12, wherein the pre-fetch module is configured to issue a pre-fetch request to the one or more other peers, wherein the pre-fetch request comprises a time deadline by which the pre-fetch request is to be fulfilled.

19. The system of claim 12, wherein the pre-fetch module is configured to prefer obtaining video content data from peers other than the parent peer of the playback module.

20. The system of claim 12, wherein the pre-fetch module is configured with a preference for obtaining video content data available at fewer peers in the pool than for obtaining video content data available at more peers in the pool.

21. The system of claim 12, wherein the pre-fetch module is configured to prefer obtaining video content data to complete downloading of a partially downloaded chunk over obtaining video content data for downloading a chunk that has not already been partially downloaded.

22. The system of claim 12, wherein, when no playback parent is available, the playback module is configured to obtain video content data from a peer in the pool that exhibits a relatively faster previous download rate of the video content data than another peer in the pool.

23. The system of claim 12, wherein the controller peer comprises a buffer map indicative of complete video content chunks available on the controller peer, and wherein the data discovery module is configured to update the buffer map as video data content is received or purged by the controller peer, and wherein the controller peer is configured to communicate the buffer map and a peer identification code to another peer.

* * * * *

UNITED STATES PATENT AND TRADEMARK OFFICE
CERTIFICATE OF CORRECTION

| | | |
|---|---|---|
| PATENT NO. | : 9,118,814 B2 | Page 1 of 1 |
| APPLICATION NO. | : 12/648105 | |
| DATED | : August 25, 2015 | |
| INVENTOR(S) | : Janardhan et al. | |

It is certified that error appears in the above-identified patent and that said Letters Patent is hereby corrected as shown below:

On the title page, in item (57), in "Abstract", in column 2, line 2, delete "LP-enabled" and insert --IP-enabled--, therefor On page 2, in column 2, under "Other Publications", line 5, delete "fiied" and insert --filed--, therefor Signed and Sealed this
First Day of March, 2016

Michelle K. Lee
*Director of the United States Patent and Trademark Office*